Feb. 14, 1961 W. F. LASER 2,971,783
ROTARY SEAL
Filed March 4, 1957

COLD - NORMAL STATIC CONDITION

HOT - NORMAL TURBINE CONDITION
REGION OF HIGH PRESSURE

INVENTOR
WILLIAM F. LASER
by: Carlson, Pitzner, Hubbard + Wolfe
ATTYS.

United States Patent Office 2,971,783
Patented Feb. 14, 1961

2,971,783
ROTARY SEAL

William F. Laser, Hinsdale, Ill., assignor to City National Bank and Trust Company of Chicago, as trustee Filed Mar. 4, 1957, Ser. No. 643,574
5 Claims. (Cl. 286—8)

The present invention relates to an improved shaft seal for preventing fluid leakage from around a rotatable shaft. More particularly, the invention concerns a seal capable of operating at extremely high temperatures and high rates of shaft rotation but which is also effective when the shaft is at rest.

The shaft seals in much modern industrial and research equipment, as may be exemplified by gas turbine engines, must withstand temperatures of over 1,000° F. and effectively seal shafts rotating at well over 100,000 r.p.m. To meet these severe demands, a type of labyrinth seal has been developed which utilizes a "floating rotor" and such a rotary seal has been disclosed in copending U.S. patent application, Serial No. 508,029, filed May 13, 1955, now Patent No. 2,917,329, issued December 15, 1959.

The "floating rotor" labyrinth seal referred to above is characterized by a complete absence of rubbing contact under normal operating conditions and depends upon the high speed rotation of the rotor to create an effectively sealing air block, all of which is discussed in detail in the above referred to application. The parts of the seal thus fit together with a certain looseness, and, since no natural or synthetic organic O rings or other resilient sealing materials can be utilized due to the high temperatures, it has been found that there is objectionable leaking through the seal when there is no high rate of rotor rotation, as when the shaft is in a standby or rest condition.

It is, therefore, the general aim of this invention to provide a high-speed, high-temperature seal of the "floating rotor" labyrinth type that seals effectively when the shaft is at rest.

With more particularity, it is an object to provide a seal of the above type having air under pressure introduced to the seal in such a manner that the rotor and stator are maintained in sealing engagement and an air block is maintained in the seal when the shaft is at rest.

It is also an object related to the foregoing to provide a rotary shaft seal capable of effective operation at all temperatures up to 1,400° F. and which will effectively seal a shaft at rest or rotating at speeds up to 150,000 r.p.m. Moreover, it is an object to provide a seal of this character that is reliable, economical and capable of giving long, trouble-free service.

In one of its aspects, it is an object of the invention to provide a "floating rotor" labyrinth seal for mid-range temperatures of up to 500° F. that affords a particularly effective positive seal under standby conditions with the shaft at rest.

Other objects and advantages of the invention will become apparent upon reading the attached detailed description and upon reference to the drawings in which.

While the invention will be described in connection with several preferred embodiments, it will be understood that I do not intend to limit the invention to those embodiments but, on the contrary, intend to cover such further alternative embodiments and constructions as may be included within the spirit and scope of the appended claims.

Figure 1:
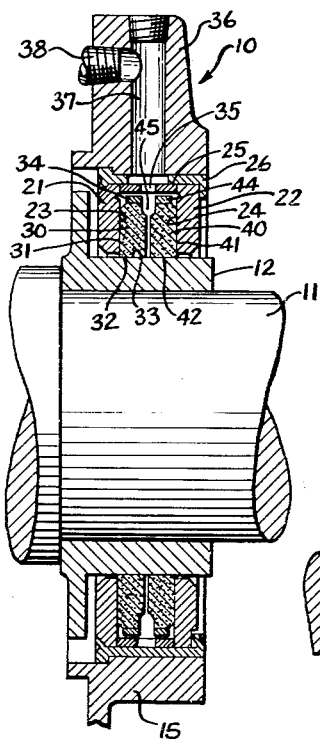
Figure 1 is a sectional view taken radially through a seal constructed according to the present invention.
Figure 2:
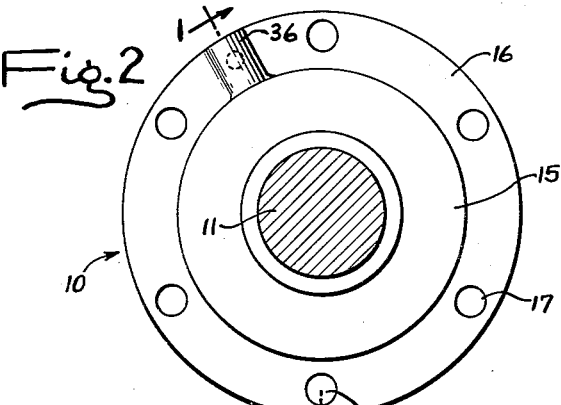
Fig. 2 is a front view of the seal shown in Fig. 1.

Turning first to Figs. 1 and 2, there is shown a seal 10 surrounding a rotatable shaft 11, only a portion of which is shown. In the illustrated embodiment, the shaft 11 carries a tightly fitting sleeve 12 which rotates therewith. The purpose of the sleeve is to provide a more easily handled and machined outer shaft surface, but it will be understood that the sleeve 12 is not necessary and that the surface of the shaft itself can be properly machined and finished to perform the function presently served by the outer surface of the sleeve 12.

The seal 10 comprises a main body or housing 15 having an integral annular flange 16 through which are formed circumferentially spaced holes 17 that are adapted to permit the seal 10 to be bolted into place on a housing wall, not shown in Figs. 1 and 2, through which the rotatable shaft 11 passes. Forming the stator or stationary element of the seal 10 are two spaced stator rings 21, 22 mounted within the seal housing 15. The stator rings 21, 22 have opposed sealing surfaces 23, 24, respectively, which are spaced at an exactly predetermined distance by means of an accurately machined spacing ring 25 sandwiched in abutting relationship between the surfaces 23, 24. This assembly of rings 21, 22, 25 is locked in proper alinement by means of a retaining band 26 which is securely fitted within the housing 15 and includes suitably formed rim portions locking the rings securely in place and in precise alinement.

It can be seen that the stator rings 21, 22, together with the spacer ring 25 form an annular chamber, opening inwardly toward the sleeve 12. The surfaces 23, 24 are machined to exact tolerances and are lap finished so as to be flat and parallel within millionths of an inch.

Carried on the sleeve 12, within the chamber formed by the rings 21, 22, 25, is an annular rotor 30 having a finely machined, and lap finished, flat sealing surface 31 closely disposed in parallel relation to the stator sealing surface 23. It will be appreciated by those skilled in the art that when the almost smooth, flat and parallel adjacent sealing surfaces 23, 31 are in abutting engagement an absolute seal is effected which does not permit the passage of gas or liquid molecules.

Figure 5:
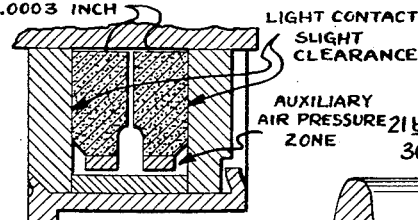
Figs. 5 and 6 show fragmentary sectional views of the seal shown in Fig. 1 under different conditions of operation with the relative spacing of the parts exaggerated for the sake of clarity.

As disclosed in the application referred to above, the rotor 30 is not tightly fitted on the sleeve 12 but rather has an inner diameter greater than the outer diameter of the sleeve so as to permit a clearance of about 0.0003 of an inch when the parts are cold and in a non-rotating static condition (see Fig. 5). To assure an effective uniform sealing contact during normal hot, high speed rotation of the shaft 11, the inner cylindrical surface 32 of the rotor 30 and the outer cylindrical surface 33 of the sleeve 12 are carefully machined and lap finished so that the surfaces are within millionths of an inch of being absolutely smooth and cylindrical.

In keeping with the invention disclosed in the above referred to application, the materials from which the sleeve 12 and the rotor 30 are formed are selected so as to have dissimilar thermal-coefficients of expansion, the coefficient of the sleeve being greater than that of the rotor. Thus, the rotor may be formed of carbon or ceramic material while the shaft and sleeve assembly is preferably formed of steel. In a practical case a rotor formed of carbon having a thermal expansion coefficient of 1.5×10—6° F. and a shaft assembly having a coefficient of 10.5×10—6° F. have been found particularly effective.

Figure 6:
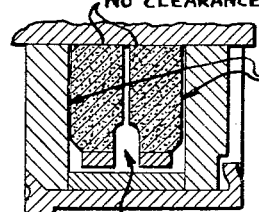

To briefly recount the operation of a seal of this type, as typically employed in a gas turbine engine, it can be first noted that the shaft assembly which includes the shaft 11 and the sleeve 12, is free to slide axially within the seal 10 due to the clearance between the sleeve and the rotor 30. This permits the shaft assembly to expand through the seal 10 as the temperature of the engine, and thus the shaft assembly, rises when the engine is started. With the increasing temperature, the shaft assembly also expands radially, to a greater extent than the rotor 30 due to their different thermal coefficients of expansion, until, upon reaching operating temperatures, the rotor 30 is securely bound to the sleeve 12 without any clearance therebetween (see Fig. 6).

When the rotor 30 becomes bound on the sleeve 12 it is no longer free to move axially with respect to the stator ring 21. If the sealing faces 23, 31 are then in in actual contact, a slight wearing away quickly takes place due to the extremely high speeds of shaft rotation encountered in a turbine engine, so that a clearance between the adjacent sealing faces 23, 31 of only a few millionths of an inch is quickly established. No seal leakage between these surfaces is permitted, however. This is because of the novel sealing effect of this type of seal. Due to the high speed of shaft rotation, molecules of gas passing between the sleeve 12 and the stator ring 21 are flung outwardly when coming in contact with very rapidly rotating rotor 30. The rotor 30 thus effectively acts as a form of centrifugal pump, and builds up a region of relatively high pressure within the chamber formed by the rings 21, 22 and 25. This region of high pressure forms an effective pressure block preventing gas or vapor molecules from passing through the seal.

It can be readily seen by those skilled in the art that the pressure formed by the spinning rotor is always higher than the gas pressure seeking to escape through the seal, since the rotor always acts to increase the adjacent gas pressure no matter what that pressure may be. Thus the seal effectively blocks the escape of gases under the extremely high pressures encountered in gas turbines and like machines. It can also be seen that there are no rubbing or sliding parts in the seal 10 during normal operation, which avoids the quite rapid wear which would inherently result from the extremely high speeds of shaft rotation at which this seal is designed to operate.

In order to reinforce the rapidly spinning rotor 30, a band 34 formed of steel or like material may be disposed in tightly surrounding relation to the rotor. The band 34 is thus effective to resist any tendency of the rotor 30 to fragment or break up at the high speeds of shaft rotation encountered.

While it can now be seen that the seal 10 provides a particularly effective sealing action at high speeds and high temperatures, it will be noted that when the seal is cold and is in a static or non-rotating condition, there exists the possibility of seal leakage. Since the rotor 30 is free to slide along the sleeve 12 when the parts are cold, any gaseous pressure on one side of the seal will simply tend to separate the sealing faces 23, 31 and permit the gas to freely leak through the seal. In addition, slight additional leakage is possible between the rotor 30 and the sleeve 12.

In accordance with the present invention, a second floating rotor is provided within the annular stator chamber and gas under pressure from an auxiliary source is introduced between the two rotors so as both to urge each rotor outwardly into sealing engagement with adjacent stator rings and to establish a region of gas pressure within the stator chamber under static conditions. In the embodiment of Figs. 1 and 2, a second rotor 40 is positioned on the sleeve 12 immediately adjacent the rotor 30. The rotors 30, 40 are identical, the latter having a flat, lap finished sealing face 41, a smooth cylindrical face 32, and a tightly fitting band 44. Each of the rotors 30, 40 have opposed relieved shoulders which together form an annular recess 45. Gas under pressure from an auxiliary source is introduced to the stator chamber surrounding the rotors 30, 40, through an aperture 35 formed in the space ring 25. In order to conduct gas under pressure to the aperture 35, the housing 15 is formed with a boss 36 through which is formed a passage 37 adapted to be connected with a pipe 38 leading to an auxiliary source of gas pressure, not shown. By acting on the sides of the recess 45, the gas pressure urges the rotors 30, 40 outwardly so as to bring the complementary sealing faces 23, 31 and 24, 41 into abutting sealing contact (see Fig. 5). The auxiliary gas pressure also leaks between the rotors 30, 40 and spreads out upon contacting the sleeve 12 so as to block the passage of unwanted gases through the seal 10 (again see Fig. 5). In this way, the auxiliary gas effectively establishes a positive seal when the floating rotor is in its cold, static condition. As will be apparent to those skilled in the art, the auxiliary gas pressure need be only slightly greater than the pressure of the gas which it is desired to seal at one side of the seal 10.

It will be noted that in the form of the invention shown in Figs. 1 and 2, the annular stator chamber surrounding the rotors 30, 40 does not have a completely sealed periphery since the aperture 35 was provided to permit the introduction of the auxiliary gas pressure. Thus, when the seal is in its normal, hot, high speed operation, the region of pressure built up by the centrifugal pump action of the rotors 30, 40 is partly relieved through the aperture 35. However, it has been found that due to the small size of this aperture in relation to the entire volume of the annular chamber, the loss of pressure on this account is slight.

Figure 3:
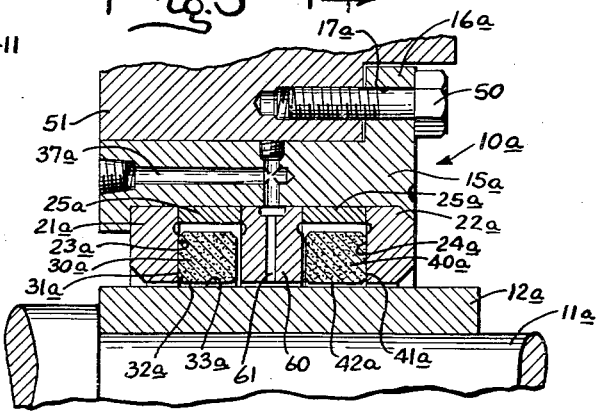
Fig. 3 is a fragmentary sectional view taken through the upper half of the modified form of seal constructed according to the present invention.

To prevent even this slight drop in the pressure of the normal sealing block, it is a feature of the invention to provide a third stator ring disposed between the two floating rotors of the seal which divides the annular stator chamber into two portions, each surrounding a single one of the rotors 30a, 40a and to introduce the auxiliary gas pressure to the two annular chamber portions through a passage formed in the third intermediate ring. This modification of the invention is illustrated in Fig. 3 where it will be observed that parts corresponding in form or function to those previously described have been given identical identifying numerals with the distinguishing suffix "a" added.

Thus, there is shown a seal 10a surrounding a sleeve 12a which is rigidly carried by the shaft 11a. The seal 10a comprises a housing 15a having an annular flange 16a in which are formed circumferentially spaced holes 17a adapted to receive bolts 50, only one of which is shown, that are effective to securely fasten the seal 10a to the housing wall 51 through which the shaft 11a passes.

Securely mounted within the seal housing 15a are stator rings 21a and 22a, each having flat, lap finished sealing surfaces 23a and 24a respectively. Mounted on the sleeve 12a adjacent the stator disk are rotors 30a and 40a each having flat, lapped sealing surfaces 31a and 41a, respectively, adjacent the stator sealing surfaces 23a, 24a. The inner surfaces of the annular rotors 31a, 41a are smooth, lapped cylindrical surfaces 32a and 42a, respectively, which slide, with slight clearance, on the outer cylindrical lapped surface 33a of the sleeve 12a.

Dividing the stator chamber into two portions is a third stator ring 60 having a passage 61 therethrough which forms a continuation of the passage 37a enabling the introduction of auxiliary gas under pressure into the two annular chamber portions surrounding the rotors 30a, 40a. It can be seen that the auxiliary gas, upon passing through the passage 61, will be directed in either direction along the surface of the sleeve 12a to thus impinge upon both of the rotors 30a, 40a so as to both urge the sealing faces 23a, 31a and 24a, 41a into abutting sealing contact and establish a gas pressure block in the two portions of the annular stator chamber surrounding the rotors 30a, 40a. It will be noted that in this embodiment, the annular chamber portions surrounding each of the rotors 30a, 40a open only inwardly and thus there is no way in which the region of high pressure built up during normal high speed operation can be even partially relieved. It will also be apparent that the seal 10a provides an exceptionally effective multiple seal. That is during normal high speed operation, as well as during static conditions through the use of the auxiliary air pressure, two gas pressure blocks are developed, one surrounding each of the rotors 30a, 40a. Thus, if a slight leakage would occur past one of the rotors, the pressure block surrounding the second rotor would effectively prevent total escape of the fluid. While not illustrated, it will be realized by those skilled in the art that the number of rotors surrounded by an annular stator chamber can be even further multiplied so that three, four, or even more rotors are incorporated in a single seal to reduce even further the slight possibility of fluid leakage.

In accordance with a further aspect of the invention, a resilient, compressible, silicone ring may be disposed between the floating rotors of the seals 10 or 10a and the rotatable sleeves 12 or 12a, respectively, in order to provide a positive seal against passage of fluid leakage along the sleeves and through the seal. It will be recalled that when in a cold static condition there is a slight clearance between the floating rotors 30, 40, 30a, 40a, and their respective sleeves 12, 12a. As stated, this clearance is very slight so that the possibility of fluid leakage is likewise slight, and further, the action of the auxiliary air pressure, as indicated by the arrows in Fig. 5, tends to prevent any leakage along the sleeves 12, 12a. However, when extreme temperatures are not likely to be encountered during operating conditions, it may be desirable to provide positive blocks such as silicone sealing rings, between the floating rotors and the sleeves upon which they are carried. While such sealing rings have been illustrated in Fig. 4 in connection with the second, or Fig. 3, embodiment of the invention, it will be understood that similar rings may also be incorporated in seals of the type illustrated in Figs. 1 and 2.

Figure 4:
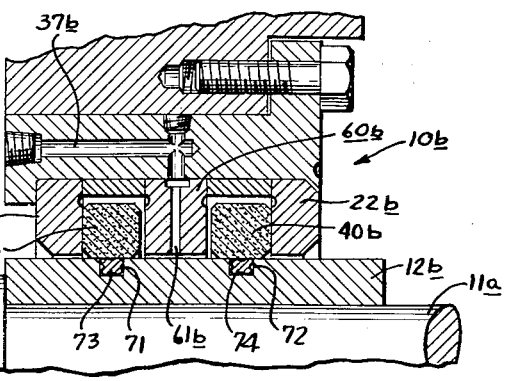
Fig. 4 is a fragmentary sectional view similar to Fig. 3 showing a second alternative modification.

Turning now to Fig. 4, it can be seen that a seal 10b is illustrated which is, for the most part, identical to the seal 10a previously described, and parts which are identical have been given the same identifying numerals with the distinguishing suffix changed from "a" to "b." In this embodiment the sleeve 12b is provided with two annular recesses 71, 72 disposed immediately beneath the floating rotors 30b, 40b, respectively. Fitted within these recesses and resiliently engaging both the rotors and the sleeve, are two resilient compressible silicone rings 73, 74. In the preferred embodiment illustrated, the silicone rings 73, 74 take the form of "quad-rings" which are a standard form of silicone ring well known to the art. Alternatively, it will be understood that conventional O rings can be utilized in lieu of the "quad-rings" 73, 74.

In operation, the rings 73, 74 extend sufficiently far outwardly from their recesses 71, 72 to snugly surround and thus sealingly engage the rotors 30b and 40b, respectively, when the seal is in its cold, static condition. During high speed, high temperature, operation, when the shaft and sleeve assembly has expanded so as to bind the floating rotors firmly on the sleeve 12b, the compressible rings 73, 74 are merely forced within their recesses and do not interfere with the normal and effective operation of the seal. Thus, the seal has all the normal effective sealing characteristics at high speed, high temperature, conditions, and in addition provides a particularly effective static seal due to the combined effects of the sealing blocks formed by the auxiliary air pressure introduced through the passages 37b and 61b, and the spaced seals created by the resilient sealing rings 73, 74.

This last described modification, utilizing the resilient compressible rings 73, 74 has temperature limitations imposed upon its use by the inherent temperature characteristics of the resilient sealing members. Thus, it has been found that the highest temperatures at which sealing rings may be relied upon, even when they are formed of temperature-resistant silicones, is approximately 500° F. This temperature is, of course, considerably below the 1400° F. temperatures at which the seals 10 and 10a may effectively function, and thus when a seal is desired for use in these upper temperature ranges, resilient compressible rings such as 73, 74 cannot be utilized.

I claim as my invention:

1. A fluid seal for rotatable shaft assemblies comprising, in combination, an annular stator surrounding the rotatable shaft, said stator having a pair of opposed and spaced radial walls with inner radial, flat, lapped, sealing surfaces, a cylindrical sealing surface formed on said shaft and disposed within the surrounding stator, said surface having an annular recess formed therein, a pair of annular rotors loosely but closely fitted on said cylindrical sealing surface between said walls, a resilient compressible sealing ring disposed within said recess and in engagement with one of said rotors to provide a seal between said shaft and said rotor, each of said rotors having radial, flat, lapped, sealing surfaces facing the sealing surfaces of the walls, said rotors and said cylindrical surface being formed of materials having different thermal coefficients of expansion so that said sealing rings are compressed and the rotors seized on said surface at high temperatures, a housing surrounding said rotors and sealed to said walls to define an annular chamber, and means to introduce a gas under pressure to said chamber between said rotors when the shaft is at rest so as to both establish a gas pressure region in said chamber resisting seal leakage and to urge the two rotors apart into sealing contact with the stator walls.

2. In a shaft assembly having a rotatable shaft passing through a housing, a fluid seal between said shaft and housing comprising, in combination, a stator fixed to said housing and surrounding said shaft, said stator having a pair of opposed and spaced radial walls, a cylindrical sealing surface formed on said shaft disposed within the surrounding stator and defining an annular recess, an annular rotor loosely but closely fitted on said cylindrical sealing surface between said walls, a resilient compressible sealing ring disposed within said recess to provide a seal between said shaft and said rotor, said walls and said rotor having a pair of adjoining flat, radial sealing surfaces, said rotor and said cylindrical surface being formed of materials having different thermal coefficients of expansion so that the rotor is seized on said surface at high temperatures, a ring sealed to said walls and around said rotor to form an annular chamber enclosing said rotor, and means to introduce a gas under pressure to said chamber for both urging said sealing surfaces into sealing contact and establishing a gas pressure region resisting seal leakage when the shaft is at rest.

3. A fluid seal for rotatable shaft assemblies comprising, in combination, an annular stator surrounding a rotatable shaft, said stator having a pair of opposed and spaced radial walls with inner radial, flat, lapped, sealing surfaces, a cylindrical sealing surface formed on said shaft and disposed within the surrounding stator, a pair of floating annular rotors loosely fitted on said cylindrical sealing surface between said walls, said rotors having radial, flat, lapped, sealing surfaces facing the sealing surfaces of the walls, a housing surrounding said rotors and sealed to said walls to define a continuous annular chamber, a third annular wall positioned between said rotors and sealed to said housing to divide said chamber into two annular portions each containing a rotor, said third wall having an aperture therethrough forming a continuation of a passage in said housing to said portions of the chamber, and means to introduce a gas under pressure to said passage when the shaft is at rest for establishing a gas pressure region resisting seal leakage and to urge said rotors away from said third wall into sealing engagement with the sealing surfaces on said pair of walls.

4. A fluid seal for rotatable shaft assemblies comprising, in combination, an annular stator surrounding a rotatable shaft, said stator having a pair of opposed and spaced radial walls with inner radial, flat, lapped, sealing surfaces, a cylindrical sealing surface formed on said shaft and disposed within the surrounding stator, said surface having an annular recess formed therein, a pair of floating annular rotors loosely fitted on said cylindrical sealing surface between said walls, a resilient compressible sealing ring disposed within said recess and in engagement with one of said rotors to provide a seal between said shaft and said rotor, each of said rotors having radial, flat, lapped, sealing surfaces facing the sealing surfaces of the walls, a housing surrounding said rotors and sealed to said walls to define a continuous annular chamber, a third annular wall positioned between said rotors and sealed to said housing to divide said chamber into two annular portions each containing a rotor, said third wall having an aperture therethrough forming a continuation of a passage in said housing to said portions of the chamber, and means to introduce a gas under pressure to said passage when the shaft is at rest for establishing a gas pressure region resisting seal leakage and to urge said rotors away from said third wall into sealing engagement with the sealing surfaces on said pair of walls.

5. A seal for blocking an opening in a wall through which a rotatable shaft passes, comprising, in combination, an annular housing surroudinng said shaft and being fixed in fluid-tight relation to said wall, a pair of opposed and spaced radial end walls sealed within said housing and having radial, flat, lapped sealing surfaces, a cylindrical sealing surface formed on said shaft and disposed within the surrounding housing, a pair of floating annular rotors loosely fitted on said cylindrical sealing surface between said end walls, said rotors having radial, flat, lapped sealing surfaces facing the sealing surfaces of the end walls, a third annular wall positioned between said rotors and sealed to said housing so as to form two continuous annular chambers each containing a rotor, a pair of annular spacer rings each surrounding one of said rotors and being sandwiched between one of said end walls and said third wall, said housing carrying means holding said end walls, spacer rings, and third wall in tightly sandwiched relation within said housing, said housing having a passage extending to a point adjacent said third wall, and said third wall having an aperture therethrough extending from the inner surface of said third wall to said passage so as to define a fluid path from said chambers to the outside of said seal.

References Cited in the file of this patent

UNITED STATES PATENTS

| Number | Name | Date |
|---|---|---|
| 811,934 | Lea et al. | Feb. 6, 1906 |
| 2,049,774 | Hoffman | Aug. 4, 1936 |
| 2,373,463 | Curtis | Apr. 10, 1945 |
| 2,479,711 | Arutunoff | Aug. 23, 1949 |
| 2,622,449 | Barker | Dec. 23, 1952 |
| 2,639,171 | Johnson | May 19, 1953 |
| 2,705,653 | MacLeod | Apr. 5, 1955 |
| 2,761,709 | Gilbert | Sept. 4, 1956 |

FOREIGN PATENTS

| Number | Country | Date |
|---|---|---|
| 179,156 | Germany | July 26, 1954 |